(12) United States Patent
Jorgensen et al.

(10) Patent No.: US 6,393,413 B1
(45) Date of Patent: May 21, 2002

(54) N-TUPLE OR RAM BASED NEURAL NETWORK CLASSIFICATION SYSTEM AND METHOD

(75) Inventors: Thomas M. Jorgensen, Olstykke; Christian Linneberg, Copenhagen, both of (DK)

(73) Assignee: Intellix A/S, Frederiksberg (DK)

( * ) Notice: Subject to any disclaimer, the term of this patent is extended or adjusted under 35 U.S.C. 154(b) by 0 days.

(21) Appl. No.: 09/174,905

(22) Filed: Oct. 19, 1998

(30) Foreign Application Priority Data

Feb. 5, 1998 (DK) .............................................. 0162/98

(51) Int. Cl.$^7$ .............................. G06F 15/18; G06G 7/00
(52) U.S. Cl. ....................................................... 706/20
(58) Field of Search ............................. 706/20, 14, 15; 382/156, 159

(56) References Cited

U.S. PATENT DOCUMENTS

| | | | | |
|---|---|---|---|---|
| 4,490,847 A | | 12/1984 | Aleksander et al. | 382/159 |
| 4,519,041 A | * | 5/1985 | Fant et al. | 382/141 |
| 5,136,687 A | | 8/1992 | Edelman et al. | 706/20 |
| 5,175,796 A | | 12/1992 | Refregier et al. | 706/20 |
| 5,179,419 A | * | 1/1993 | Palmquist et al. | 356/73.1 |
| 5,239,594 A | | 8/1993 | Yoda | 382/158 |
| 5,299,284 A | | 3/1994 | Roy | 706/20 |
| 5,467,427 A | | 11/1995 | Kothari et al. | 706/25 |
| 5,479,574 A | | 12/1995 | Glier et al. | 706/25 |
| 5,479,575 A | | 12/1995 | Yoda | 706/20 |

(List continued on next page.)

FOREIGN PATENT DOCUMENTS

| | | |
|---|---|---|
| EP | 0300648 A1 | 1/1989 |
| EP | 454535 B1 | 6/1995 |
| EP | 689154 A2 | 12/1995 |
| EP | 671040 B1 | 3/1997 |
| EP | 446084 B1 | 6/1997 |
| EP | 694192 B1 | 7/1997 |
| GB | 2112194 A | 7/1983 |
| WO | 9200572 | 1/1992 |

OTHER PUBLICATIONS

Bradshaw et al.; "Improving the Generalisation of the N–Tuple Classifier Using the Effective VC Dimension". IEEE[online], Electronic Letters, 09–1996, vol. 32, No. 20, pp. 1904–1905.*

Hepplewhite et al.; "Texture Classification Using N–Tuple Pattern Recognition". IEEE[online], Proceedings of the 13th International Conference on Pattern Recognition, 08–1996, vol. 3, pp. 159–163.*

(List continued on next page.)

Primary Examiner—George B. Davis
Assistant Examiner—Kelvin Booker
(74) Attorney, Agent, or Firm—Birch, Stewart, Kolasch & Birch, LLP

(57) ABSTRACT

A method and system for training a computer classification system which can be defined by a network of a number of n-tuples or Look Up Tables (LUTs), with each n-tuple or LUT including a number of rows corresponding to at least a subset of possible classes and further including a number of columns being addressed by signals or elements of sampled training input data examples, each column being defined by a vector having cells with values, wherein the column vector cell values are determined based on one or more training sets of input data examples for different classes so that at least part of the cells comprise or point to information based on the number of times the corresponding cell address is sample from one or more sets of training input examples, and weight cell values are determined, corresponding to one or more column vector cells being addressed or sampled by the training examples.

49 Claims, 7 Drawing Sheets

U.S. PATENT DOCUMENTS

| | | | | |
|---|---|---|---|---|
| 5,487,133 A | * | 1/1996 | Park et al. | 706/20 |
| 5,544,256 A | * | 8/1996 | Brecher et al. | 382/149 |
| 5,572,597 A | * | 11/1996 | Chang et al. | 382/125 |
| 5,664,067 A | | 9/1997 | Moed et al. | 706/25 |
| 5,678,677 A | * | 10/1997 | Baudat | 194/206 |
| 5,682,503 A | | 10/1997 | Yoda | 706/20 |
| 5,701,398 A | * | 12/1997 | Glier et al. | 706/41 |
| 5,778,362 A | * | 7/1998 | Deerwester | 707/5 |
| 6,021,220 A | * | 2/2000 | Anderholm | 382/194 |
| 6,081,620 A | * | 6/2000 | Anderholm | 382/194 |
| 6,092,059 A | * | 7/2000 | Straforini et al. | 706/14 |
| 6,223,183 B1 | * | 4/2001 | Smith et al. | 707/102 |

OTHER PUBLICATIONS

Leveridge et al.; "Experiments with an N–Tuple Recognizer for Fast "First Try" Recognition of Unconstrained Handwritten Symbols". IEEE[online], 9th International Conference on Pattern Recognition, 11–1988, vol. 2, pp. 905–907.*

Lucas et al.; "Recognition of Chain–Coded Handwritten Character Images with Scanning N–Tuple method". IEEE [online], Electronics Letters, 11/1995, vol. 31, Iss. 24, pp 2088–2089.*

Allison, N.M.; "Neurons, N–Tuples and Faces". IEEE[online], Computing and Control Engineering Journal, 07/1990, vol. 1, Iss. 4, pp. 173–183.*

Tarling et al.; "Efficient Use of Training Data in the N–Tuple Recognition Method". IEEE[online], Electronic Letters, 11/1993, vol. 29, No. 24, pp. 2093–2094.*

Hepplewhite et al.; "N–Tuple Texture Recognition and the Zero Crossing Sketch". IEEE[online], Electronics Letter, 1–1997, vol. 33, No. 1, pp. 45–46.*

Lucus, S. M.; "Real–Time Face Recognition with the Continuous N–Tuple Classifier". IEEE[online], IEE Colloquium–High Performance Architectures for Real–Time Image Procesing (Ref. No. 1998/197), 02/1998, pp. 11/1–11/7.*

Ouslim et al.; "P Pattern Recognition Based on a Probablistic RAM Net Using N–Tuple Input Mapping". IEEE [online], IEE Proceedings—Vision, Image and Signal Processing, 12/1998, vol. 145, Iss. 6, pp. 415–420.*

Simoes et al.; "The Adaptive Weight Using RAM". IEEE [online], 1997 International Conference on Systems, Man, and Cybernetics, 10/1997, vol. 5, pp. 4053–4056.*

Lucas, S.; "Can Scanning N–Tuple Classifiers Be Improved by Pre–Transforming Training Data?" IEEE[online], IEE Workshop on Handwritting Analysis and Recognition—A European Perspective, 04/1996, pp. 4/1–4/6.*

Lucas, S.; "Rapid Content–Based Retrieval from Document Image Databases". IEEE[online], IEE Colloquium on Intelligent Image Databases, 04/1996, pp. 10/1–10/6.*

Lucas et l.; "Statistical Syntactic Methods for High–Performance OCR". IEEE[online], IEE Proceedings—Visual, Image and Signal Processing, 02/1996, vol. 1, Iss. 1, pp. 23–30.*

Allinson et al.; "A Principled Approach to N–Tuple Recognition Systems". IEEE[online], IEE Colloquium on Pattern Recognition (Digest No. 1997/018), 02/1997, pp 2/1–2/10.*

Lucas, S. M.; "Continuous N–Tuple Classifier and Its Application to Face Recognition". IEEE[online], Electronic Letters, 09/1997, vol. 33, Iss. 20, pp. 1676–1678.*

Linneberg et al.; "Discetization Methods for Encoding of Continuous Input Variables for Boolean Neural Networks". IEEE [online], International Joint Conference on Neural Networks, 07/1999, vol. 2, pp. 1219–1224.*

Linneberg et al.; "Theoretical Analysis and Improved Decision Criteria for the n–Tuple Classifier". IEEE[online], IEEE Transactions on Pattern Analysis and Machine Intelligence, 04/1999, vol. 21, No. 4, pp. 336–347.*

Jorgensen, T. M.; "A RAM–based Neural Net with Inhibitory Weights and its Application to Recognising Handwritten Digits". IEEE[online], Proceedings of the International Workshop on Neural Networks, 08–1996, pp. 228–236.*

Ludemir et al.; "Weightless Neural Models: A Review of Current and Past Works". Neural Computing Surveys 2, 02/1999, pp. 41–61. Obtained online on Jun. 25, 2001. Retrieved from the Internet: www.icsi.berkeley.edu/~jagota/NCS/VOL2/P2$_{13}$html/ludermir.html.*

Bishop et al.; "Evolutionary learning to optimise mapping in n–Tuple networks". IEEE Colloquium on Machine Learning, 03–1990, p. 3/1–3/3.*

Classification of Handwritten Digits using a RAM Neural Net Architecture. T.M. Jorgensen, Optics & Fluid Dynamics Department, Riso National Laboratory, Roskilde, Denmark, PP 17–25, (Feb. 1997).

Crossvalidation and Information Measures for RAM Based Neural Networks. T.M. Jorgensen et al RISNational Laboratory, Roskilde, Denmark, pp. 1–11, Jul. 1995.

Benchmarking the n–tuple Classifier with StatLog datasets, R. Rohwer and M. Morciniec. Dept. of Computer Science and Applied Mathematics Aston University, Birmingham, UK. PP 1–6, 10/1997.

The n–tuple Classifier: Too Good to Ignore. M. Morciniec and R. Rohwer, Dept. of Computer Science and Applied Mathematics Aston University, Birmingham, UK. PP 1–11, (Jun. 15, 1995).

A General Model of Stochastic Neural Processing. D. Gorse and J. G. Taylor, Dept of Psychology, University College, London, UK. Biological Cybernetics, vol. Cynbern. 63, 299–306 (Mar., 1990).

CMAC: An Associative Neural Network Alternative to Backpropagation. W.T. Miller, III et al. Proceedings of the IEEE. vol. 78. No. 10, Oct. 1990, PP 1561–1567.

The Adaptive Weight Using RAM. E. do Valle Simoes et al. Instituto de Informatica Universidade Federal do Rio Grande do Sul, Porto Alegre Brazil. PP 1–4, Oct. 1997.

APRIS: Automatic Pattern Recogniton and Inspection System, Mehenni B. et al., Proceedings of the Annual Computers in Design, Manufacturing and Production Conference (COMPEURO), Paris–Evry, May 4, 1993, XP000463849, p. 23–28.

Parallel Character Recognition System: Theory, Simulation and Synthesis, Slobodan Ribaric et al., Microprocessing and Microprogramming, vol. 22, No. 5, Dec. 1, 1988, XP000038022 p. 333–346.

Classification of Handwritten Digits Using a Ram Neural Net Architecture, Jorgensen T.M., International Journal of Neural Systems, vol. 8, No. 1, Feb., 1997, p. 17–25.

Cross–Validation and Information Measures for Ram Based Neural Networks, Jorgensen, T.M. et al., Proceedings of the Weightless Neural Network Workshop WNNW, vol., 1995, p. 78–88.

Binary Neural Systems: Combining Weighted and Weightless Properties, I. Aleksander et al., Intelligent Systems Engineering Winter 1994, p. 211–221.

\* cited by examiner

N-TUPLE OR RAM BASED NEURAL NETWORK CLASSIFICATION SYSTEM AND METHOD

BACKGROUND OF THE INVENTION

1. Field of the Invention

The present invention relates generally to n-tuple or RAM based neural network classification systems and, more particularly, to n-tuple or RAM based classification systems having weight vectors with element values being determined during a training process.

2. Description of the Prior Art

A known way of classifying objects or patterns represented by electric signals or binary codes and, more precisely, by vectors of signals applied to the inputs of neural network classification systems lies in the implementation of a so-called learning or training phase. This phase generally consists of the configuration of a classification network that fulfils a function of performing the envisaged classification as efficiently as possible by using one or more sets of signals, called learning or training sets, where the membership of each of these signals in one of the classes in which it is desired to classify them is known. This method is known as supervised learning or learning with a teacher.

A subclass of classification networks using supervised learning are networks using memory-based learning. Here, one of the oldest memory-based networks is the "n-tuple network" proposed by Bledsoe and Browning (Bledsoe, W. W. and Browning, I, 1959, "Pattern recognition and reading by machine", Proceedings of the Eastern Joint Computer Conference, pp. 225–232) and more recently described by Morciniec and Rohwer (Morciniec, M. and Rohwer, R.,1996, "A theoretical and experimental account of n-tuple classifier performance", Neural Comp., pp. 629–642).

One of the benefits of such a memory-based system is a very fast computation time, both during the learning phase and during classification. For the known types of n-tuple networks, which is also known as "RAM networks" or "weightless neural networks", learning may be accomplished by recording features of patterns in a random-access memory (RAM), which requires just one presentation of the training set(s) to the system.

The training procedure for a conventional RAM based neural network is described by Jørgensen (co-inventor of this invention) et al. (Jørgensen, T. M., Christensen, S. S. and Liisberg, C.,1995, "Cross-validation and information measures for RAM based neural networks", Proceedings of the Weightless Neural Network Workshop WNNW95 (Kent at Canterbury, UK) ed. D. Bisset, pp.76–81) where it is described how the RAM based neural network may be considered as comprising a number of Look Up Tables (LUTs). Each LUT may probe a subset of a binary input data vector. In the conventional scheme the bits to be used are selected at random. The sampled bit sequence is used to construct an address. This address corresponds to a specific entry (column) in the LUT. The number of rows in the LUT corresponds to the number of possible classes. For each class the output can take on the values 0 or 1. A value of 1 corresponds to a vote on that specific class. When performing a classification, an input vector is sampled, the output vectors from all LUTs are added, and subsequently a winner takes all decision is made to classify the input vector. In order to perform a simple training of the network, the output values may initially be set to 0. For each example in the training set, the following steps should then be carried out:

Present the input vector and the target class to the network, for all LUTs calculate their corresponding column entries, and set the output value of the target class to 1 in all the "active" columns.

By use of such a training strategy it may be guaranteed that each training pattern always obtains the maximum number of votes. As a result such a network makes no misclassification on the training set, but ambiguous decisions may occur. Here, the generalisation capability of the network is directly related to the number of input bits for each LUT. If a LUT samples all input bits then it will act as a pure memory device and no generalisation will be provided. As the number of input bits is reduced the generalisation is increased at an expense of an increasing number of ambiguous decisions. Furthermore, the classification and generalisation performances of a LUT are highly dependent on the actual subset of input bits probed. The purpose of an "intelligent" training procedure is thus to select the most appropriate subsets of input data.

Jørgensen et al. further describes what is named a "cross validation test" which suggests a method for selecting an optimal number of input connections to use per LUT in order to obtain a low classification error rate with a short overall computation time. In order to perform such a cross validation test it is necessary to obtain a knowledge of the actual number of training examples that have visited or addressed the cell or element corresponding to the addressed column and class. It is therefore suggested that these numbers are stored in the LUTs. It is also suggested by Jørgensen et al. how the LUTs in the network can be selected in a more optimum way by successively training new sets of LUTs and performing cross validation test on each LUT. Thus, it is known to have a RAM network in which the LUTs are selected by presenting the training set to the system several times.

In an article by Jørgensen (co-inventor of this invention) (Jørgensen. T. M. "Classification of handwritten digits using a RAM neural net architecture", February 1997, International Journal of Neural Systems, Vol. 8, No. 1, pp. 17–25 it is suggested how the class recognition of a RAM based network can be further improved by extending the traditional RAM architecture to include what is named "inhibition". This method deals with the problem that in many situations two different classes might only differ in a few of their features. In such a case, an example outside the training set has a high risk of sharing most of its features with an incorrect class. So, in order to deal with this problem it becomes necessary to weight different features differently for a given class. Thus, a method is suggested where the network includes inhibition factors for some classes of the addressed columns. Here, a confidence measure is introduced, and the inhibition factors are calculated so that the confidence after inhibition corresponds to a desired level.

The result of the preferred inhibition scheme is that all addressed LUT cells or elements that would be set to 1 in the simple system are also set to 1 in the modified version, but in the modified version column cells being set to 1 may further comprise information of the number of times the cell has been visited by the training set. However, some of the cells containing 0's in the simple system will have their contents changed to negative values in the modified network. In other words, the conventional network is extended so that inhibition from one class to another is allowed.

In order to encode negative values into the LUT cells, it is not sufficient with one bit per cell or element as with a traditional RAM network. Thus, it is preferred to use one byte per cell with values below 128 being used to represent different negative values, whereas values above 128 are used for storing information concerning the number of training examples that have visited or addressed the cell. When classifying an object the addressed cells having values greater than or equal to 1 may then be counted as having the value 1.

By using inhibition, the cells of the LUTs are given different values which might be considered a sort of "weighting". However, it is only cells which have not been visited by the training set that are allowed to be suppressed by having their values changed from 0 to a negative value. There is no boosting of cells having positive values when performing classification of input data. Thus, very well performing LUTs or columns of LUTs might easily drown when accompanied by the remaining network.

Thus, there is a need for a RAM classification network which allows a very fast training or learning phase and subsequent classification, but which at the same time allows real weights to both boost and suppress cell values of LUT columns in order to obtain a proper generalisation ability of the sampled number of input bits based on access information of the training set. Such a RAM based classification system is provided according to the present invention.

SUMMARY OF THE INVENTION

According to a first aspect of the present invention there is provided a method for training a computer classification system which can be defined by a network comprising a number of n-tuples or Look Up Tables (LUTs), with each n-tuple or LUT comprising a number of rows corresponding to at least a subset of possible classes and further comprising a number of columns being addressed by signals or elements of sampled training input data examples, each column being defined by a vector having cells with values, said method comprising determining the column vector cell values based on one or more training sets of input data examples for different classes so that at least part of the cells comprise or point to information based on the number of times the corresponding cell address is sampled from one or more sets of training input examples, and determining weight cell values corresponding to one or more column vector cells being addressed or sampled by the training examples.

According to a second aspect of the present invention there is provided a method of determining weight cell values in a computer classification system which can be defined by a network comprising a number of n-tuples or Look Up Tables (LUTs), with each n-tuple or LUT comprising a number of rows corresponding to at least a subset of possible classes and further comprising a number of column vectors with at least part of said column vectors having corresponding weight vectors, each column vector being addressed by signals or elements of a sampled training input data example and each column vector and weight vector having cells with values being determined based on one or more training sets of input data examples for different classes, said method comprising determining the column vector cell values based on the training set(s) of input examples so that at least part of said values comprise or point to information based on the number of times the corresponding cell address is sampled from the set(s) of training input examples, and determining weight vector cell values corresponding to one or more column vector cells.

Preferably, the weight cell values are determined based on the information of at least part of the determined column vector cell values and by use of at least part of the training set(s) of input examples. According to the present invention the training input data examples may preferably be presented to the network as input signal vectors.

It is preferred that determination of the weight cell values is performed so as to allow weighting of one or more column vectors cells of positive value and/or to allow boosting of one or more column vector cells during a classification process. Furthermore, or alternatively, the weight cell values may be determined so as to allow suppressing of one or more column vector cells during a classification process.

The present invention also provide a method wherein the determination of the weight cell values allows weighting of one or more column vector cells having a positive value (greater than 0) and one or more column vector cells having a non-positive value (lesser than or equal to 0). Preferably, the determination of the weight cells allows weighting of any column vector cell.

In order to determine or calculate the weight cell values, the determination of these values may comprise initialising one or more sets of weight cells corresponding to at least part of the column cells, and adjusting at least part of the weight cell values based on the information of at least part of the determined column cell values and by use of at least part of the training set(s) of input examples. When determining the weight cell values it is preferred that these are arranged in weight vectors corresponding to at least part of the column vectors.

In order to determine or adjust the weight cell values according to the present invention, the column cell values should be determined. Here, it is preferred that at least part of the column cell values are determined as a function of the number of times the corresponding cell address is sampled from the set(s) of training input examples. Alternatively, the information of the column cells may be determined so that the maximum column cell value is 1, but at least part of the cells have an associated value being a function of the number of times the corresponding cell address is sampled from the training set(s) of input examples. Preferably, the column vector cell values are determined and stored in storing means before the adjustment of the weight vector cell values.

According to the present invention, a preferred way of determining the column vector cell values may comprise the training steps of
 a) applying a training input data example of a known class to the classification network, thereby addressing one or more column vectors,
 b) incrementing, preferably by one, the value or vote of the cells of the addressed column vector(s) corresponding to the row(s) of the known class, and
 c) repeating steps (a)–(b) until all training examples have been applied to the network.

However, it should be understood that the present invention also covers embodiments where the information of the column cells is determined by alternative functions of the number of times the cell has been addressed by the input training set(s). Thus, the cell information does not need to comprise a count of all the times the cell has been addressed, but may for example comprise an indication of when the cell has been visited zero times, once, more than once, and/or twice and more than twice and so on.

So far it has been mentioned that weight cell values may be determined for one or more column cells, but in a preferred embodiment all column vectors have corresponding weight vectors.

When initialising weight cell values according to embodiments of the present invention, the initialisation may comprise setting each weight cell value to a predetermined specific cell value. These values may be different for different cells, but all weight cell values may also be set to a predetermined constant value. Such a value may be 0 or 1, but other values may be preferred.

In order to determine the weight cell values, it is preferred to adjust these values, which adjustment process may comprise one or more iteration steps. The adjustment of the weight cell values may comprise the steps of determining a global quality value based on at least part of the weight and column vector cell values, determining if the global quality value fulfils a required quality criterion, and adjusting at least part of the weight cell values until the global quality criterion is fulfilled.

The adjustment process may also include determination of a local quality value for each sampled training input example, with one or more weight cell adjustments being performed if the local quality value does not fulfil a specified or required local quality criterion for the selected input example. As an example the adjustment of the weight cell values may comprise the steps of a) selecting an input example from the training set(s), b) determining a local quality value corresponding to the sampled training input example, the local quality value being a function of at least part of the addressed weight and column cell values, c) determining if the local quality value fulfils a required local quality criterion, if not, adjusting one or more of the addressed weight vector cell values if the local quality criterion is not fulfilled, c) selecting a new input example from a predetermined number of examples of the training set(s), e) repeating the local quality test steps (b)–(d) for all the predetermined training input examples, f) determining a global quality value based on at least part of the weight and column vectors being addressed during the local quality test, g) determining if the global quality value fulfils a required global quality criterion, and, h) repeating steps (a)–(g) until the global quality criterion is fulfilled. Preferably, steps (b)–(d) of the above mentioned adjustment process may be carried out for all examples of the training set(s).

The local and/or global quality value may be defined as functions of at least part of the weight and/or column cells. Correspondingly, the global and/or the local quality criterion may also be functions of the weight and/or column cells. Thus, the quality criterion or criteria need not be a predetermined constant threshold value, but may be changed during the adjustment iteration process. However, the present invention also covers embodiments in which the quality criterion or criteria is/are given by constant threshold values.

It should be understood that when adjusting the weight cell values by use of one or more quality values each with a corresponding quality criterion, it may be preferred to stop the adjustment iteration process if a quality criterion is not fulfilled after a given number of iterations.

It should also be understood that during the adjustment process the adjusted weight cell values are preferably stored after each adjustment, and when the adjustment process includes the determination of a global quality value, the step of determination of the global quality value may further be followed by separately storing the hereby obtained weight cell values or classification system configuration values if the determined global quality value is closer to fulfil the global quality criterion than the global quality value corresponding to previously separately stored weight cell values or configuration values.

A main reason for training a classification system according to an embodiment of the present invention is to obtain a high confidence in a subsequent classification process of an input example of an unknown class.

Thus, according to a further aspect of the present invention, there is also provided a method of classifying input data examples into at least one of a plurality of classes using a computer classification system configured according to any of the above described methods of the present invention, whereby the column cell values and the corresponding weight cell values are determined for each n-tuple or LUT based on one or more training sets of input data examples, said method comprising a) applying an input data example to be classified to the configured classification network thereby addressing column vectors and corresponding weight vectors in the set of n-tuples or LUTs, b) selecting a class thereby addressing specific rows in the set of n-tuples or LUTs, b) determining an output value as a function of values of addressed weight cells, d) repeating steps (b)–(c) until an output has been determined for all classes, d) comparing the calculated output values, and f) selecting the class or classes having maximum output value.

When classifying an unknown input example, several functions may be used for determining the output values from the addressed weight cells. However, it is preferred that the parameters used for determining the output value includes both values of addressed weight cells and addressed column cells. Thus, as an example, the output value may be determined as a first summation of all the addressed weight cell values corresponding to column cell values greater than or equal to a predetermined value. In another preferred embodiment, the step of determining an output value comprises determining a first summation of all the addressed weight cell values corresponding to column cell values greater than or equal to a predetermined value, determining a second summation of all the addressed weight cell values, and determining the output value by dividing the first summation by the second summation. The predetermined value may preferably be set to 1.

The present invention also provides training and classification systems according to the above described methods of training and classification.

Thus, according to the present invention there is provided a system for training a computer classification system which can be defined by a network comprising a stored number of n-tuples or Look Up Tables (LUTs), with each n-tuple or LUT comprising a number of rows corresponding to at least a subset of possible classes and further comprising a number of columns being addressed by signals or elements of sampled training input data examples, each column being defined by a vector having cells with values, said system comprising input means for receiving training input data examples of known classes, means for sampling the received input data examples and addressing column vectors in the stored set of n-tuples or LUTs, means for addressing specific rows in the set of n-tuples or LUTs, said rows corresponding to a known class, storage means for storing determined n-tuples or LUTs, means for determining column vector cell values so as to comprise or point to information based on the number of times the corresponding cell address is sampled from the training set(s) of input examples, and means for determining weight cell values corresponding to one or more column vector cells being addressed or sampled by the training examples.

The present invention also provides a system for determining weight cell values of a classification network which can be defined by a stored number of n-tuples or Look Up Tables (LUTs), with each n-tuple or LUT comprising a number of rows corresponding to at least a subset of the number of possible classes and further comprising a number of column vectors with at least part of said column vectors having corresponding weight vectors, each column vector being addressed by signals or elements of a sampled training input data example and each column vector and weight vector having cell values being determined during a training process based on one or more sets of training input data examples, said system comprising: input means for receiving training input data examples of known classes, means for sampling the received input data examples and addressing column vectors and corresponding weight vectors in the stored set of n-tuples or LUTs, means for addressing specific rows in the set of n-tuples or LUTs, said rows corresponding to a known class, storage means for storing determined n-tuples or LUTs, means for determining column vector cell values so as to comprise or point to information based on the number of times the corresponding cell address is sampled from the training set(s) of input examples, and means for determining weight vector cell values corresponding to one or more column vector cells.

Here, it is preferred that the means for determining the weight cell values is adapted to determine these values based on the information of at least part of the determined column vector cell values and by use of at least part of the training set(s) of input examples.

Preferably, the means for determining the weight cell values is adapted to determine these values so as to allow weighting of one or more column cells of positive value and/or to allow boosting of one or more column cells during a classification process. The determining means may furthermore, or alternatively, be adapted to determine the weight cell values so as to allow suppressing of one or more column vector cells during a classification process.

According to an embodiment of the present invention the weight determining means may be adapted to determine the weight cell values so as to allow weighting of one or more column vector cells having a positive value (greater than 0) and one or more column vector cells having a non-positive value (lesser than or equal to 0). Preferably, the means may further be adapted to determine the weight cell values so as to allow weighting of any column cell. It is also preferred that the means for determining the weight cell values is adapted to determine these values so that the weight cell values are arranged in weight vectors corresponding to at least part of the column vectors.

In order to determine the weight cell values according to a preferred embodiment of the present invention, the means for determining the weight cell values may comprise means for initialising one or more sets of weight vectors corresponding to at least part of the column vectors, and means for adjusting weight vector cell values of at least part of the weight vectors based on the information of at least part of the determined column vector cell values and by use of at least part of the training set(s) of input examples.

As already discussed above the column cell values should be determined in order to determine the weight cell values. Here, it is preferred that the means for determining the column vector cell values is adapted to determine these values as a function of the number of times the corresponding cell address is sampled from the set(s) of training input examples. Alternatively, the means for determining the column vector cell values may be adapted to determine these cell values so that the maximum value is 1, but at least part of the cells have an associated value being a function of the number of times the corresponding cell address is sampled from the training set(s) of input examples.

According to an embodiment of the present invention it is preferred that when a training input data example belonging to a known class is applied to the classification network thereby addressing one or more column vectors, the means for determining the column vector cell values is adapted to increment the value or vote of the cells of the addressed column vector(s) corresponding to the row(s) of the known class, said value preferably being incremented by one.

In order to initialise the weight cells according to an embodiment of the invention, it is preferred that the means for initialising the weight vectors is adapted to setting the weight cell values to one or more predetermined values.

For the adjustment process of the weight cells it is preferred that the means for adjusting the weight vector cell values is adapted to determine a global quality value based on at least part of the weight and column vector cell values, determine if the global quality value fulfils a required global quality criterion, and adjust at least part of the weight cell values until the global quality criterion is fulfilled.

As an example of a preferred embodiment according to the present invention, the means for adjusting the weight vector cell values may be adapted to a) determine a local quality value corresponding to a sampled training input example, the local quality value being a function of at least part of the addressed weight and column vector cell values, b) determine if the local quality value fulfils a required local quality criterion, b) adjust one or more of the addressed weight vector cell values if the local quality criterion is not fulfilled, c) repeat the local quality test for a predetermined number of training input examples, d) determine a global quality value based on at least part of the weight and column vectors being addressed during the local quality test, e) determine if the global quality value fulfils a required global quality criterion, and, f) repeat the local and the global quality test until the global quality criterion is fulfilled.

The means for adjusting the weight vector cell values may further be adapted to stop the iteration process if the global quality criterion is not fulfilled after a given number of iterations. In a preferred embodiment, the means for storing n-tuples or LUTs comprises means for storing adjusted weight cell values and separate means for storing best so far weight cell values or best so far classification system configuration values. Here, the means for adjusting the weight vector cell values may further be adapted to replace previously separately stored best so far weight cell values with obtained adjusted weight cell values if the determined global quality value is closer to fulfil the global quality criterion than the global quality value corresponding to previously separately stored best so far weight values. Thus, even if the system should not be able to fulfil the global quality criterion within a given number of iterations, the system may always comprise the "best so far" system configuration.

According to a further aspect of the present invention there is also provided a system for classifying input data examples of unknown classes into at least one of a plurality of classes, said system comprising: storage means for storing a number or set of n-tuples or Look Up Tables (LUTs) with each n-tuple or LUT comprising a number of rows corresponding to at least a subset of the number of possible classes and further comprising a number of column vectors with corresponding weight vectors, each column vector being addressed by signals or elements of a sampled input data example and each column vector and weight vector having cells with values being determined during a training process based on one or more sets of training input data examples, said system further comprising: input means for receiving an input data example to be classified, means for sampling the received input data example and addressing columns and corresponding weight vectors in the stored set of n-tuples or LUTs, means for addressing specific rows in the set of n-tuples or LUTs, said rows corresponding to a specific class, means for determining an output value as a function of addressed weight cells, and means for comparing calculated output values corresponding to all classes and selecting the class or classes having maximum output value.

According to a preferred embodiment of the classification system of the present invention, the output determining means comprises means for producing a first summation of all the addressed weight vector cell values corresponding to a specific class and corresponding to column vector cell values greater than or equal to a predetermined value. It is also preferred that the output determining means further comprises means for producing a second summation of all the addressed weight vector cell values corresponding to a specific class, and means for determining the output value by dividing the first summation by the second summation.

It should be understood that it is preferred that the cell values of the column and weight vectors of the classification system according to the present invention are determined by use of a training system according to any of the above described systems. Accordingly, these cell values may be determined during a training process according to any of the above described methods.

BRIEF DESCRIPTION OF THE DRAWINGS

For a better understanding of the present invention and in order to show how the same may be carried into effect, reference will now be made by way of example to the accompanying drawings in which.

DETAILED DESCRIPTION OF THE INVENTION

In the following a more detailed description of the architecture and concept of a classification system according to the present invention will be given including an example of a training process of the column cells of the architecture and an example of a classification process. Furthermore, different examples of learning processes for weight cells according to embodiments of the present invention are described.

Notation

The notation used in the following description and examples is as follows:

X: The training set.

$\bar{x}$: An example from the training set.

$N_X$: Number of examples in the training set X.

$\bar{x}_j$: The j'th example from a given ordering of the training set X.

$\bar{y}$: A specific example (possible outside the training set).

C: Classlabel.

$C(\bar{x})$: Class label corresponding to example $\bar{x}$ (the true class).

$C_W$: Winner Class obtained by classification.

$C_R$: Runner Up Class obtained by classification.

$\Lambda(\bar{x})$: Leave-one-out cross-validation classification for example $\bar{x}$.

$N_C$: Number of training classes corresponding to the maximum number of rows in a LUT.

$\Omega$: Set of LUTs (each LUT may contain only a subset of all possible address columns, and the different columns may register only subsets of the existing classes).

$N_{LUT}$: Number of LUTs.

$N_{COL}$: Number of different columns that can be addressed in a specific LUT (LUT dependent).

$S_C$: The set of training examples labelled class C.

$w_{iC}$: Weight for the cell addressed by the i'th column and the C'th class.

$v_{iC}$: Entry counter for the cell addressed by the i'th column and the C'th class.

$a_i(\bar{y})$: Index of the column in the i'th LUT being addressed by example $\bar{y}$.

$\bar{v}$: Vector containing all $v_{iC}$ elements of the LUT network.

$\bar{w}$: Vector containing all $w_{iC}$ elements of the LUT network.

$Q_L(\bar{v},\bar{w},\bar{x},X)$: Local quality function.

$Q_G(\bar{v},\bar{w},X)$: Global quality function.

Description of Architecture and Concept

Figure 1:
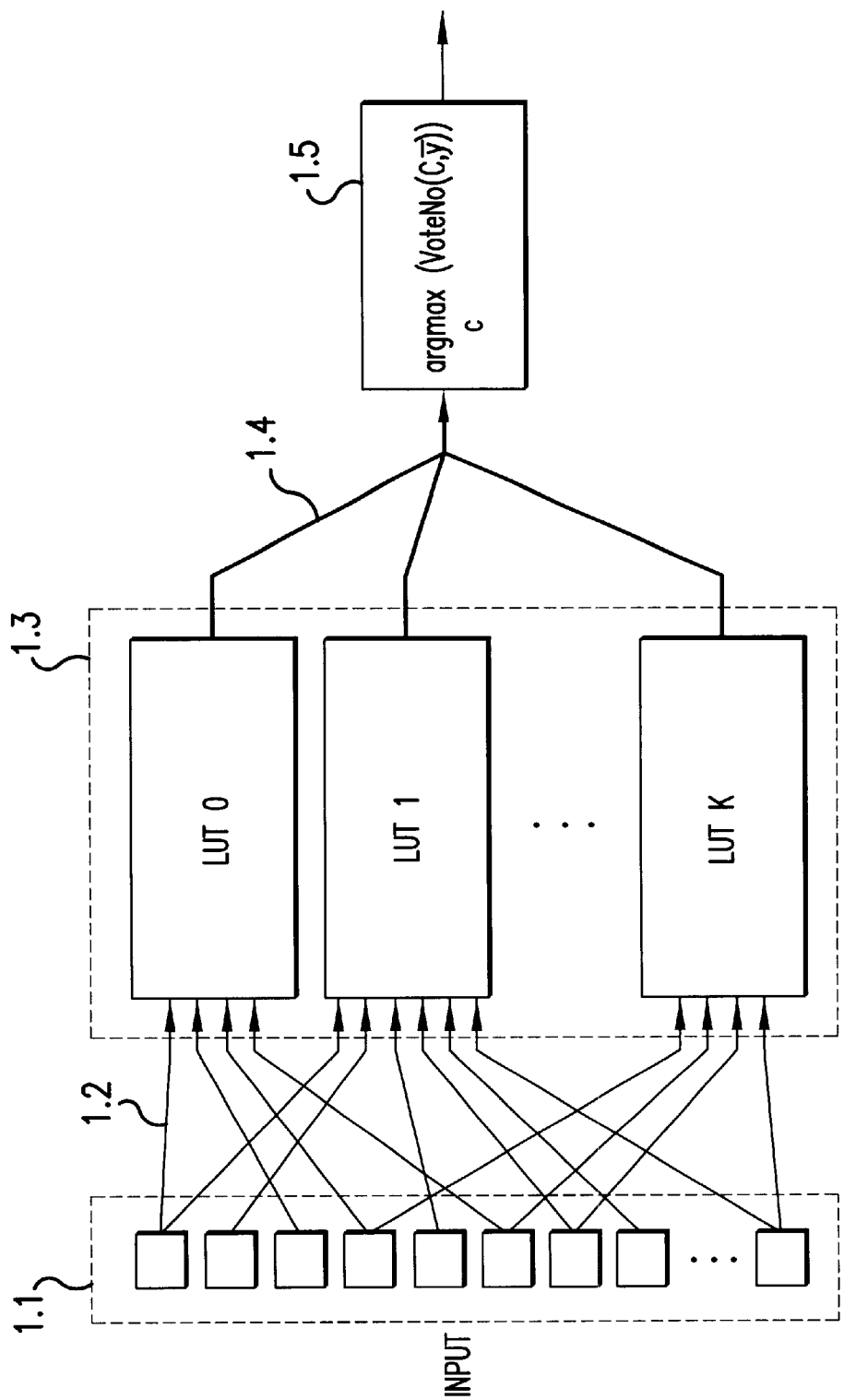
FIG. 1 shows a block diagram of a RAM classification network with Look Up Tables (LUTs)

In the following references are made to FIG. 1, which shows a block diagram of a RAM classification network with Look Up Tables (LUTs), and FIG. 2, which shows a detailed block diagram of a single Look Up Table (LUT) according to an embodiment of the present invention.

A RAM-net or LUT-net consists of a number of Look Up Tables (LUTs) (1.3). Let the number of LUTs be denoted $N_{LUT}$. An example of an input data vector $\bar{y}$ to be classified may be presented to an input module (1.1) of the LUT network. Each LUT may sample a part of the input data, where different numbers of input signals may be sampled for different LUTs (1.2) (in principle it is also possible to have one LUT sampling the whole input space). The outputs of the LUTs may be fed (1.4) to an output module (1.5) of the RAM classification network.

Figure 2:
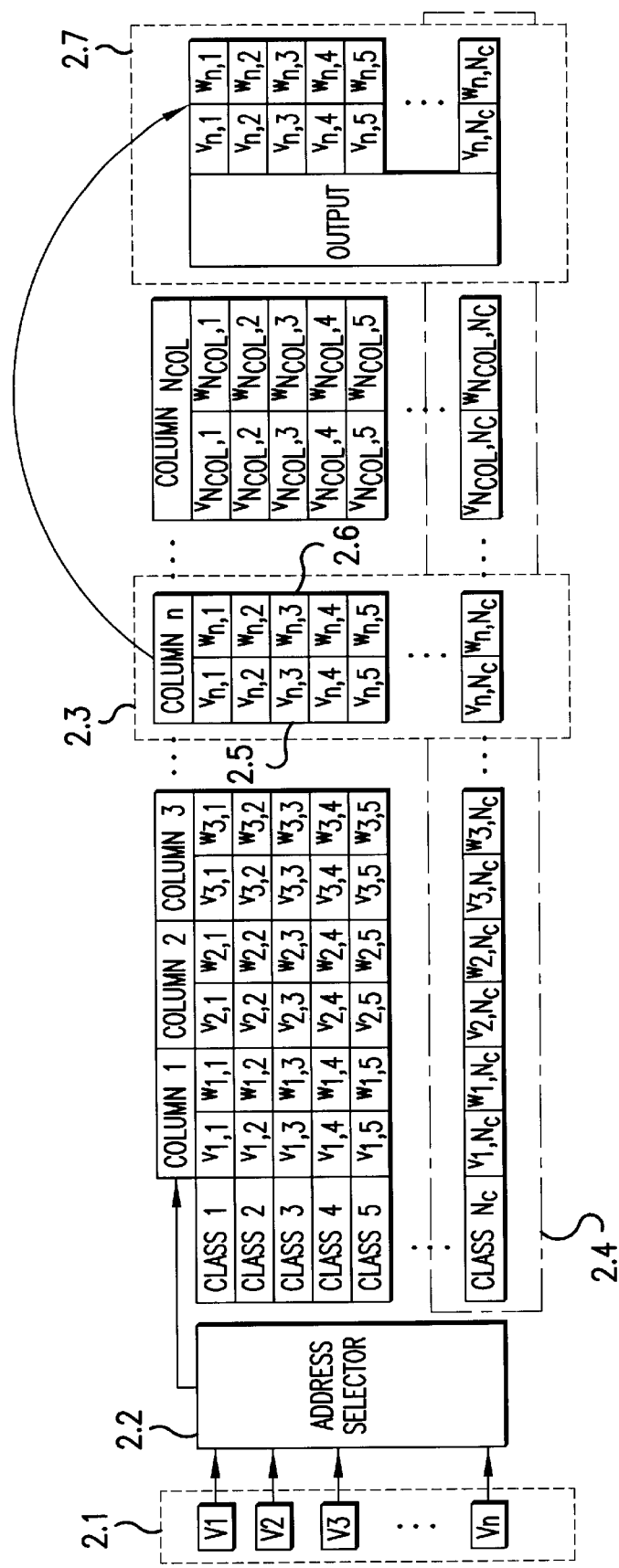
FIG. 2 shows a detailed block diagram of a single Look Up Table (LUT) according to an embodiment of the present invention.

In FIG. 2 it is shown that for each LUT the sampled input data (2.1) of the example presented to the LUT-net may be fed into an address selecting module (2.2). The address selecting module (2.2) may from the input data calculate the address of one or more specific columns (2.3) in the LUT. As an example, let the index of the column in the i'th LUT being addressed by an input example $\bar{y}$ be calculated as $a_i(\bar{y})$. The number of addressable columns in a specific LUT may be denoted $N_{COL}$, and varies in general from one LUT to another. The information stored in a specific row of a LUT may correspond to a specific class C (2.4). The maximum number of rows may then correspond to the number of classes, $N_C$. In a preferred embodiment, every column within a LUT contains two sets of cells. The number of cells within each set corresponds to the number of rows within the LUT. The first set of cells may be denoted column vector cells and the cell values may correspond to class specific entry counters of the column in question. The other set of cells may be denoted weight cells or weight vector cells with cell values which may correspond to weight factors, each of which may be associated with one entry counter value or column vector cell value. The entry counter value for the cell addressed by the i'th column and class C is denoted $v_{iC}$ (2.5). The weight value for the cell addressed by the i'th column and class C is denoted $w_{iC}$ (2.6).

The $v_{iC}$- and $w_{iC}$-values of the activated LUT columns (2.7) may be fed (1.4) to the output module (1.5), where a vote number may be calculated for each class and where finally a winner-takes-all (WTA) decision may be performed.

Let $\bar{x} \in X$ denote an input data example used for training and let $\bar{y}$ denote an input data example not belonging to the training set. Let $C(\bar{x})$ denote the class to which $\bar{x}$ belongs. The class assignment given to the example $\bar{y}$ is then obtained by calculating a vote number for each class. The vote number obtained for class C is calculated as a function of the $v_{iC}$ and $w_{iC}$ numbers addressed by the example $\bar{y}$:

$$\text{VoteNo}(C,\bar{y}) = \text{function}(v_{a_1(\bar{y}),C}, w_{a_1(\bar{y}),C}, v_{a_2(\bar{y}),C}, w_{a_2(\bar{y}),C}, \ldots, v_{a_{NLUT}(\bar{y}),C}, w_{a_{NLUT}(\bar{y}),C})$$

From the calculated vote numbers the winner class, $C_W$, can be obtained as:

$$C_W = \text{argmax}_C(\text{VoteNo}(C,\bar{y})), 1 \leq C \leq N_C.$$

An example of a sensible choice of $\text{VoteNo}(C,\bar{y})$ is the following expression:

$$\text{VoteNo}(C, \bar{y}) = \frac{\sum_{i \in \Omega} w_{a_i(\bar{y}),C} \Theta_1(v_{a_i(\bar{y}),C})}{\sum_{i \in \Omega} w_{a_i(\bar{y}),C}}$$

$$= \frac{\sum_{i \in \Omega} w_{a_i(\bar{y}),C} \Theta_1\left(\sum_{\bar{x} \in S_C} \delta_{a_i(\bar{x}),a_i(\bar{y})}\right)}{\sum_{i \in \Omega} w_{a_i(\bar{y}),C}},$$

where $\delta_{i,j}$ is Kroneckers delta ($\delta_{i,j}=1$ if $i=j$ and 0 otherwise), and $$\Theta_n(z) = \begin{cases} 1 & \text{if } z \geq n \\ 0 & \text{if } z < n \end{cases}.$$

$\Omega$ describes the set of LUTs making up the whole LUT network. $S_C$ denotes the set of training examples labelled class C. The special case with all $w_{iC}$-values set to 1 gives the traditional LUT network, $$C_W = \text{argmax}_C\left(\sum_{i \in \Omega} \Theta_1(v_{a_i(\bar{y}),C})\right).$$

Figure 3:
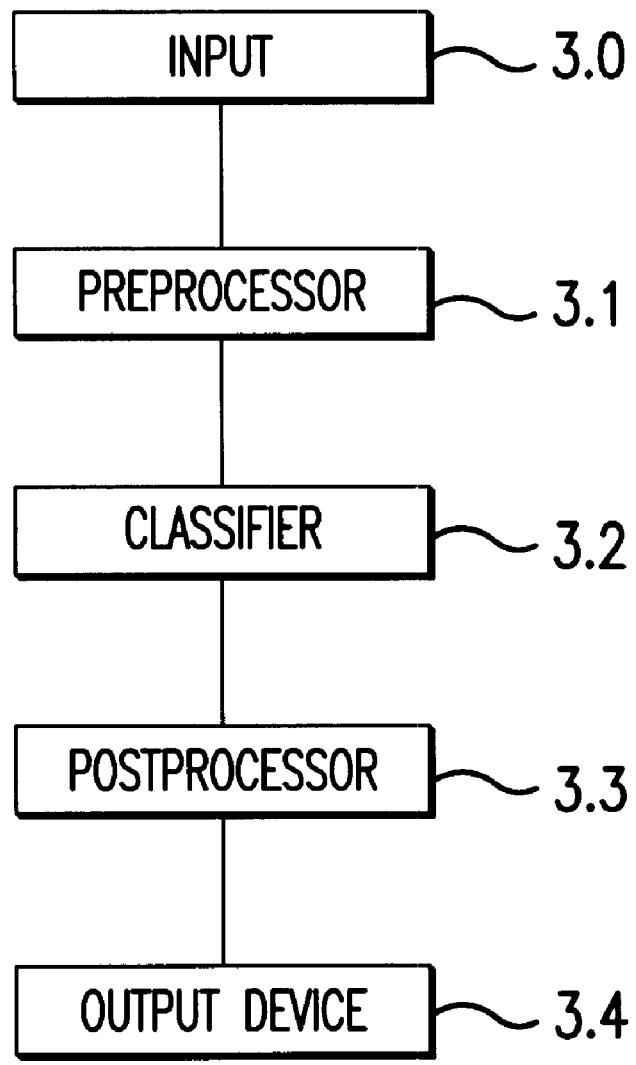
FIG. 3 shows a block diagram of a computer classification system according to the present invention.

FIG. 3 shows an example of a block diagram of a computer classification system according to the present invention. Here a source such as a video camera or a database provides an input data signal or signals (3.0) describing the example to be classified. These data are fed to a pre-processing module (3.1) of a type which can extract features, reduce, and transform the input data in a predetermined manner. An example of such a pre-processing module is a FFT-board (Fast Fourier Transform). The transformed data are then fed to a classification unit (3.2) comprising a RAM network according to the present invention. The classification unit (3.2) outputs a ranked classification list which might have associated confidences. The classification unit can be implemented by using software to programme a standard Personal Computer or programming a hardware device, e.g. using programmable gate arrays combined with RAM circuits and a digital signal processor. These data can be interpreted in a post-processing device (3.3), which could be a computer module combining the obtained classifications with other relevant information. Finally the result of this interpretation is fed to an output device (3.4) such as an actuator.

Initial Training of the Architecture

Figure 4:
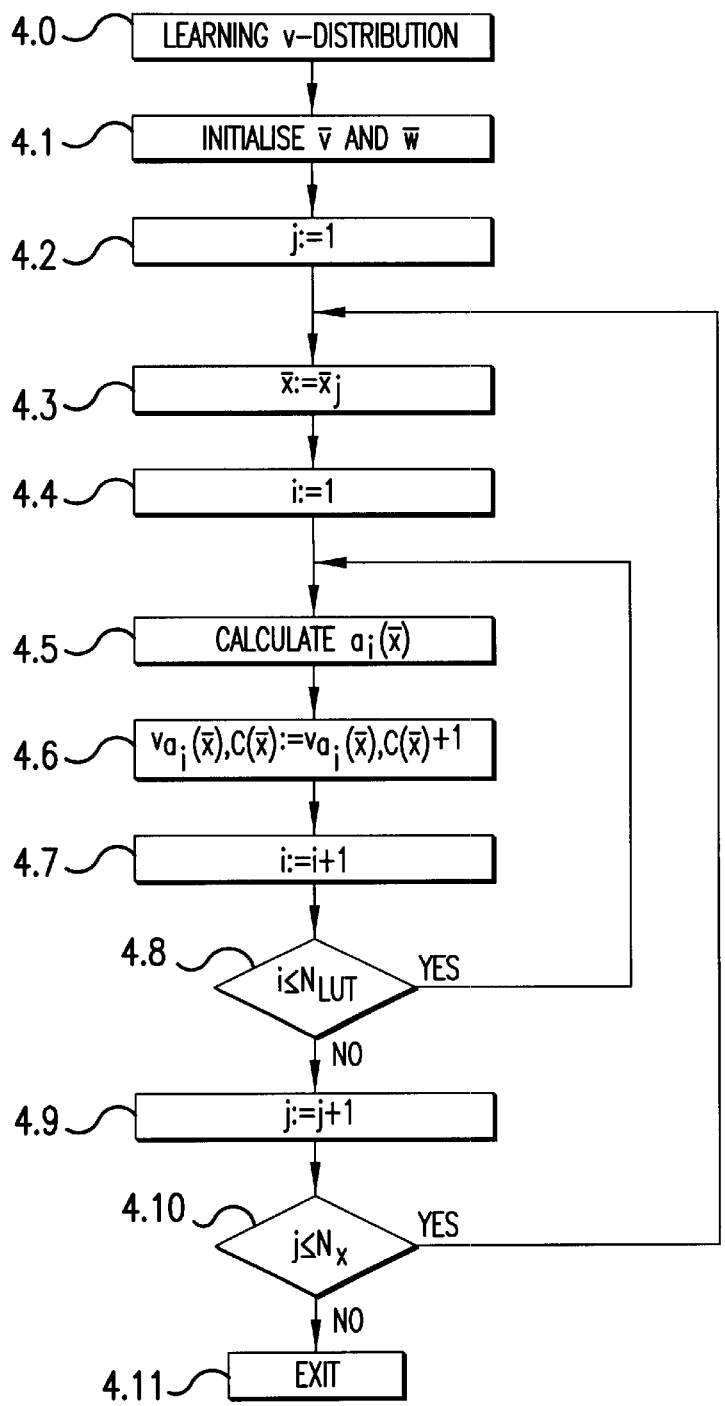
FIG. 4 shows a flow chart of a learning process for LUT column cells according to an embodiment of the present invention.

The flow chart of FIG. 4 illustrates a one pass learning scheme or process for the determination of the column vector entry counter or cell distribution, $v_{iC}$-distribution (4.0), according to an embodiment of the present invention, which may be described as follows:

1. Initialise all entry counters or column vector cells by setting the cell values, $\bar{v}$, to zero and initialise the weight values, $\bar{w}$. This could be performed by setting all weight values to a constant factor, or by choosing random values from within a specific range (4.1).
2. Present the first training input example, $\bar{x}$, from the training set X to the network (4.2, 4.3)
3. Calculate the columns addressed for the first LUT (4.4, 4.5).
4. Add 1 to the entry counters in the rows of the addressed columns that correspond to the class label of $\bar{x}$ (increment $v_{a_i(\bar{x}),C(\bar{x})}$ in all LUTs) (4.6).
5. Repeat step 4 for the remaining LUTs (4.7, 4.8).
6. Repeat steps 3–5 for the remaining training input examples (4.9, 4.10). The number of training examples is denoted $N_X$.

Classification of an Unknown Input Example

When the RAM network of the present invention has been trained to thereby determine values for the column cells and the weight cells whereby the LUTs may be defined, the network may be used for classifying an unknown input data example.

In a preferred example according to the present invention, the classification is performed by determining the class having a maximum vote number, VoteNo, where VoteNo is given by the expression $$\text{VoteNo}(C, \bar{y}) = \frac{\sum_{i \in \Omega} w_{a_i(\bar{y}),C} \Theta_1(v_{a_i(\bar{y}),C})}{\sum_{i \in \Omega} w_{a_i(\bar{y}),C}}$$

If the denominator is zero the VoteNo can be defined to be 0.

Thus, the classification example may be described as follows by reference to FIGS. 1 and 2:

Present an unknown input example, $\bar{y}$, to the network (1.1).

For all LUTs calculate the columns $a_i(\bar{y})$ addressed by $\bar{y}$ (2.3).

For each class (corresponding to a specific row in each of the addressed columns) produce the sum (sum_1) of $w_{a_i(\bar{y}),C}\Theta_1(v_{a_i(\bar{y}),C})$. The $\Theta_1(v_{a_i(\bar{y}),C})$ term implies that $w_{ai(\bar{y}),C}$ components only are included if $v_{a_i(\bar{y}),C} \leq 1$ (1.5).

For each class (corresponding to a specific row in each of the addressed columns) produce the sum (sum_2) of $w_{a_i(\bar{y}),C}$ (1.5).

Calculate the output value corresponding to class C as Out[C]=sum_1/sum_2 (1.5).

Choose the class (or classes) that maximise Out[C] (1.5).

Figure 7:
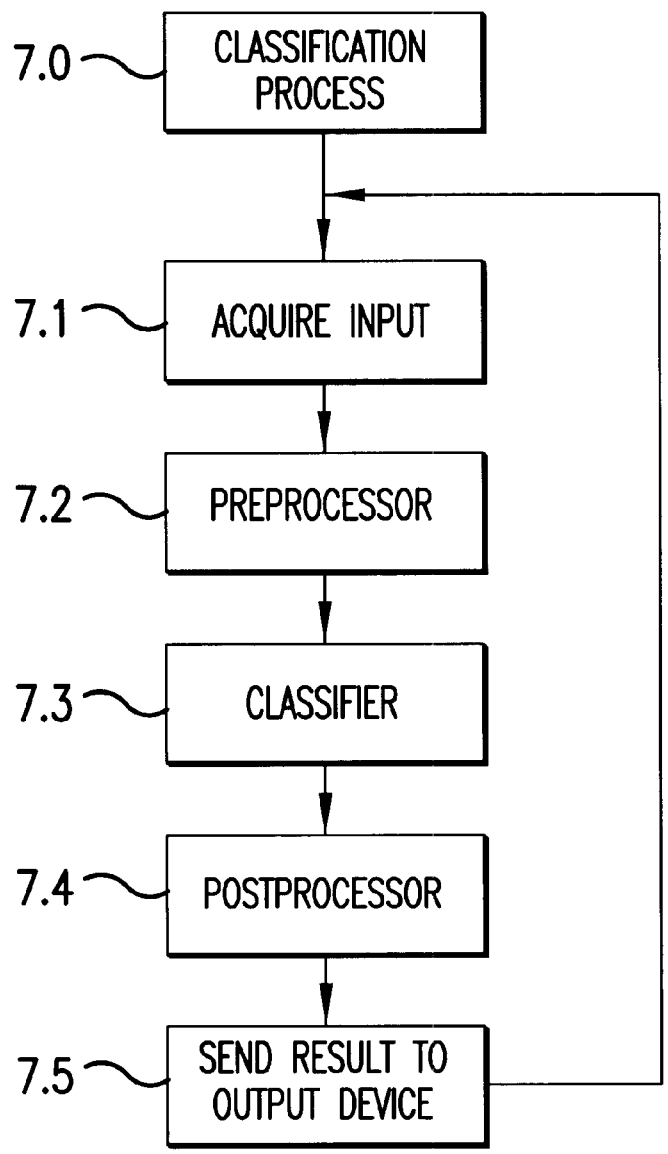
FIG. 7 shows a flow chart of a classification process according to the present invention.

FIG. 7 shows a block diagram of the operation of a computer classification system in which a classification process (7.0) is performed. The system acquires one or more input signals (7.1) using e.g. an optical sensor system. The obtained input data are pre-processed (7.2) in a pre-processing module, e.g. a low-pass filter, and presented to a classification module (7.3) which according to an embodiment of the invention may be a LUT-network. The output data from the classification module is then post-processed in a post-processing module (7.4), e.g. a CRC algorithm calculating a cyclic redundancy check sum, and the result is forwarded to an output device (7.5), which could be a monitor screen.

Weight Adjustments

Usually the initially determined weight cell values will not present the optimal choice of values. Thus, according to a preferred embodiment of the present invention, an optimisation or adjustment of the weight values should be performed.

In order to select or adjust the weight values to improve the performance of the classification system, it is suggested according to an embodiment of the invention to define proper quality functions for measuring the performance of the weight values. Thus, a local quality function $Q_L(\bar{v},\bar{w},\bar{x},X)$ may be defined, where $\bar{v}$ denotes a vector containing all $V_{iC}$ elements of the LUT network, and $\bar{w}$ denotes a vector containing all $w_{iC}$ elements of the LUT network. The local quality function may give a confidence measure of the output classification of a specific example $\bar{x}$. If the quality value does not satisfy a given criterion (possibly dynamically changed during the iterations), the weights $\bar{w}$ are adjusted to make the quality value satisfy or closer to satisfying the criterion (if possible).

Furthermore a global quality function: $Q_G(\bar{v},\bar{w},X)$ may be defined. The global quality function may measure the performance of the input training set as a whole.

Figure 5:
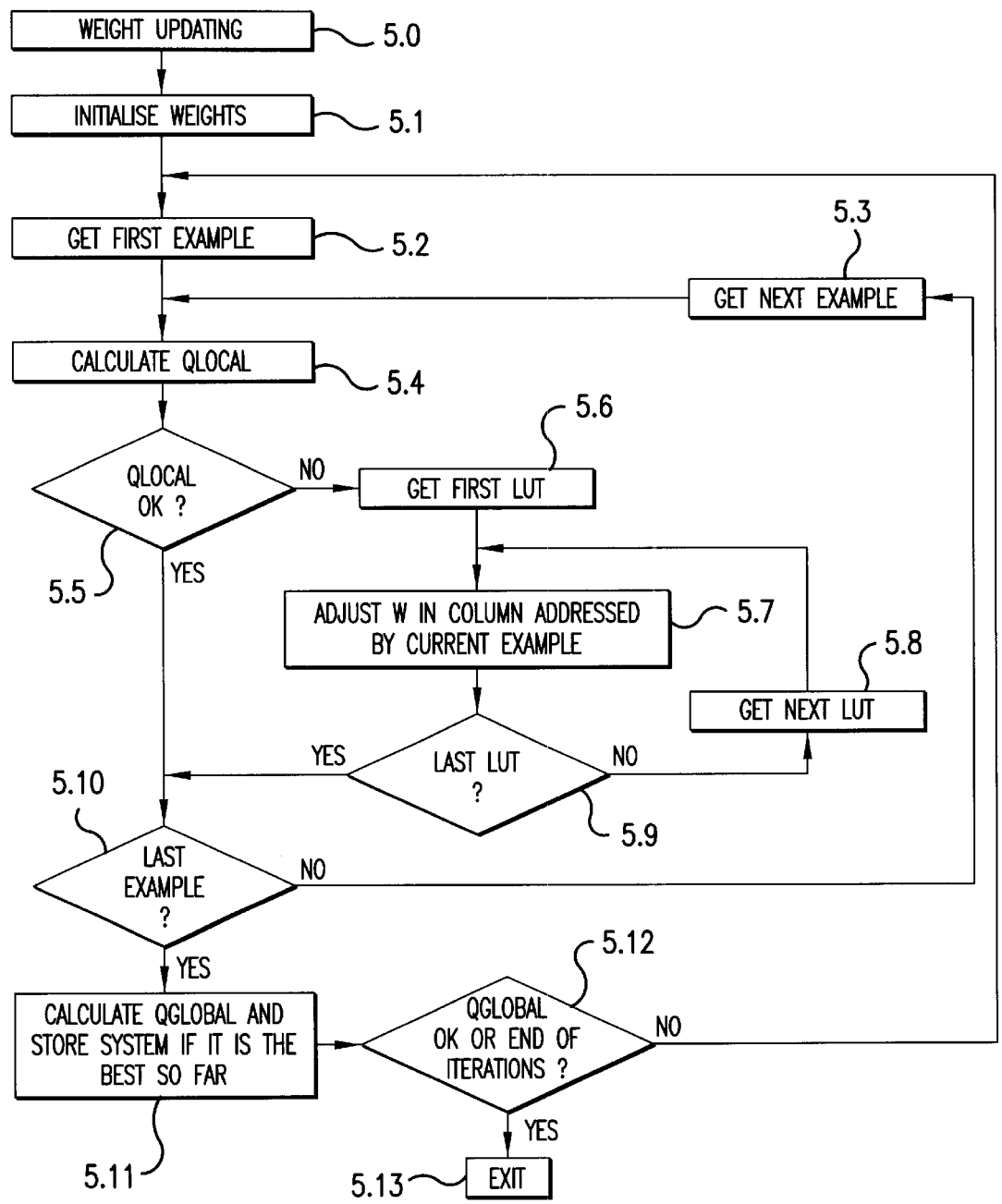
FIG. 5 shows a flow chart of a learning process for weight cells according to a first embodiment of the present invention.

FIG. 5 shows a flow chart for weight cell adjustment or learning according to the present invention. The flow chart of FIG. 5 illustrates a more general adjustment or learning process, which may be simplified for specific embodiments.

EXAMPLE 1

The vote number function for an input example $\bar{y}$ is given as $$VoteNo(C, \bar{y}) = \frac{\sum_{i \in \Omega} w_{a_i(\bar{y}),C}\Theta_1(v_{a_i(\bar{y}),C})}{\sum_{i \in \Omega} w_{a_i(\bar{y}),C}}$$

With this definition of the VoteNo( ) function a leave-one-out cross-validation classification for an input example $\bar{x}$ of the training set may be calculated as:

$$\Lambda(\bar{x}) = \underset{C}{\operatorname{argmax}} \left( \frac{\sum_{i \in \Omega} w_{a_i(\bar{x}),C}\Theta_{1+\delta_{C(\bar{x}),C}}(v_{a_i(\bar{x}),C})}{\sum_{i \in \Omega} w_{a_i(\bar{x}),C}} \right)$$

This expression is actually explained above except for the factor $\Theta_{1+\delta_{C(\bar{x}),C}}(v_{ai(\bar{x}),C})$ which is equal to $\Theta_1(v_{a_i(\bar{x}),C})$ if $C \neq C(\bar{x})$ and equal to $\Theta_2(v_{a_i(\bar{x}),C})$ if $C = C(\bar{x})$. $\Theta_2(v_{a_i(\bar{x}),C})$ is only 1 if $v_{a_i(\bar{x}),C} \leq 2$, else it is 0. This simply assures that an example cannot obtain contributions from itself when calculating the leave-one-out cross-validation.

Let the local quality function calculated for the example $\bar{x}$ be defined as:

$$Q_L(\bar{v},\bar{w},\bar{x},X) = \delta_{\Lambda(\bar{x}),C(\bar{x})}.$$

Here $Q_L$ is 0 if $\bar{x}$ generates a cross-validation error, else $Q_L$ is 1. SO if $Q_L=0$ then weight changes are made.

Let the global quality function be defined as:

$$Q_G(\bar{v}, \bar{w}, X) = \sum_{\bar{x} \in X} \delta_{\Lambda(\bar{x}),C(\bar{x})} = \sum_{\bar{x} \in X} Q_L(\bar{v}, \bar{w}, \bar{x}, X),$$

This global quality function measures the number of examples from the training set X that would be correctly classified if they were left out of the training set as each term in the sum over the training set is 1 if $C(\bar{x})=\Lambda(\bar{x})$ and else 0. The global quality criterion may be to satisfy $Q_G > \epsilon N_X$, where $\epsilon$ is a parameter determining the fraction of training examples demanded to be correctly classified in a leave-one-out crossvalidation test.

An updating scheme for improving $Q_G$ can be implemented by the following rules:

For all input examples $\bar{x}$ of the training set with a wrong cross-validation classification ($\Lambda(\bar{x}) \neq C(\bar{x})$) adjust the weights by:

$$w_{a_i(\bar{x}),C(\bar{x})}{}^{New} = \max(w_{a_i(\bar{x}),C(\bar{x})}{}^{Old} + k \cdot \Theta_2(v_{a_i(\bar{x}),C(\bar{x})}) - k \cdot (1 - \Theta_2(v_{a_i(\bar{x}),C(\bar{x})})), 0),$$

where k is a small constant. A feasible choice of k could be one tenth of the mean of the absolute values of the $w_{iC}$ values.

This updating rule implies that $w_{a_i(\bar{x}),C(\bar{x})}{}^{New} = w_{a_i(\bar{x}),C(\bar{x})}{}^{Old} + k$ if $v_{a_i(\bar{x}),C(\bar{x})} \leq 2$ and that $w_{a_i(\bar{x}),C(\bar{x})}{}^{New} = w_{a_i(\bar{x}),C(\bar{x})}{}^{Old} - k$ if $v_{a_i(\bar{x}),C(\bar{x})} \leq 2$. The max( ) function ensures that the weights cannot become negative.

Referring now to FIG. 5, the weight update or adjustment steps of example 1 may be described as:

Initialise all $w_{iC}$ values to zero (5.1).

Loop through all examples in the training set (5.2, 5.10, 5.3).

Calculate the local quality value for each example (can the example be correctly classified if excluded from the training set?) (5.4, 5.5).

If yes proceed with next example (5.10). If not increase the addressed weights of the "true" class if the corresponding column cells adds a positive contribution to the VoteNo( ) function (i.e. if $v_{a_i(\bar{x}),C(\bar{x})} \leq 2$) and decrease the weights of the "true" class otherwise (i.e. if $v_{a_i(\bar{x}),C(\bar{x})} \leq 2$) (5.6–5.9).

Calculate the global quality value. If the quality is the highest obtained hitherto store the LUT network (5.11).

Repeat until global quality value is satisfactory or other exit condition is fulfilled (5.12, 5.13).

EXAMPLE 2

Let the vote number function for an input example $\bar{y}$ be given as $$VoteNo(C, \bar{y}) = \frac{\sum_{i \in \Omega} w_{a_i(\bar{y}),C} \Theta_1(v_{a_i(\bar{y}),C}) \Theta_0(w_{a_i(\bar{y}),C})}{\sum_{i \in \Omega} |w_{a_i(\bar{y}),C}|}$$

For the true class $C(\bar{x})$ sum the $w_{a_i(\bar{x}),C(\bar{x})}$ values for a given v-value using the function $$Hist(l, C(\bar{x})) = \sum_{i \in \Omega} \delta_{l,v_{a_i(\bar{x}),C(\bar{x})}} w_{a_i(\bar{x}),C(\bar{x})}.$$

The parameter l runs over the possible values of $v_{i,C}$, $0 \leq v_{i,C} \leq N_X$. A confidence Conf between the winning class, $C_W$, and the runner-up class $C_R$ may then be defined as:

$$Conf = \begin{cases} \dfrac{VoteNo(C_W, \bar{x}) \sum_{i \in \Omega} w_{a_i(\bar{x}),C_W}}{VoteNo(C_R, \bar{x}) \sum_{i \in \Omega} w_{a_i(\bar{x}),C_R}}, & \text{if } (C_W = C(\bar{x})) \\ 0, & \text{if } (C_W \neq C(x)) \end{cases}$$

A value m may be determined by the function:

$$m = \max\left(\arg\sum_{l=1}^{n} Hist(l, C(\bar{x})) \leq Conf\right)$$

The upper limit of the summation index n can vary from 1 to the maximum $v_{iC}$ value within the $\bar{v}$ vector. The expression states that m is chosen as the largest value of n for which $$\sum_{l=1}^{n} Hist(l, C(\bar{x})) \leq Conf$$

A local quality function may now be defined as:

$$Q_L(\bar{v}, \bar{w}, \bar{x}, X) = \begin{cases} m - m_{thresh} & \text{if } C_W = C(\bar{x}) \\ 0 & \text{if } C_W \neq C(\bar{x}) \end{cases}$$

where $m_{thresh}$ is a threshold constant. If $Q_L \leq 0$ then the weights $w_{ij}$ are updated to make $Q_L$ increase, by adjusting the weights on the runner-up class, $C_R$:

$$w_{a_i(\bar{x}),C_R}^{New} = w_{a_i(\bar{x}),C_R}^{Old} - k_1 \cdot \Theta_1(v_{a_i(\bar{x}),C_R}) + k_2 \cdot (1 - \Theta_1(v_{a_i(\bar{x}),C_R}))$$

This updating rule implies that $w_{a_i(\bar{x}),C_R}^{New} = w_{a_i(\bar{x}),C_R}^{Old} - k_1$ if $v_{a_i(\bar{x}),C_R} \leq 1$ and that $$w_{a_i(\bar{x}),C_R}^{Old} = w_{a_i(\bar{x}),C_R}^{New} + k_2 \text{ if } v_{a_i(\bar{x}),C_R} \leq 1.$$

The global quality criterion may be based on two quality functions:

$$Q_{G1}(\bar{v}, \bar{w}, X) = \sum_{\bar{x} \in X} \delta_{\Lambda(\bar{x}),C(\bar{x})}$$

and $$Q_{G2}(\bar{v}, \bar{w}, X) = \sum_{\bar{x} \in X} \Theta_0(Q_L(\bar{v}, \bar{w}, \bar{x}, X))$$

Here $\Theta_0(Q_L)$ is 1 if $Q_L \leq 0$ and 0 if $Q_L \leq 0$. $Q_{G1}$ measures the number of examples from the training set that can pass a leave one out cross-validation test and $Q_{G2}$ measures the number of examples that can pass the local quality criterion.

These two quality functions can then be combined in to one quality function based on the following boolean expression (a true expression is given the value 1 and a false expression is given the value 0):

$$Q_G(\bar{v},\bar{w},X) = (Q_{G1}(\bar{v},\bar{w},X) > \epsilon_1 N_X) \cdot (Q_{G2}(\bar{v},\bar{w},X) > \epsilon_2 N_X)$$

Here $\epsilon_1$ and $\epsilon_2$ are two parameters determining the fractions of training examples demanded to pass a leave-one-out crossvalidation test and the local quality criterion, respectively. If both of these criterions are passed the global quality criterion is passed in which case $Q_G(\bar{v},\bar{w},X)$ is 1, otherwise it is 0.

With reference to FIG. 5, the weight updating or adjustment steps of example 2 may be described as:

Initialise all $w_{iC}$ values to zero (5.1).

Loop through all examples in the training set (5.2, 5.10, 5.3).

Calculate the local quality value for each example (5.4) (Does the example have sufficient "support"? (5.5)).

If yes process next example (5.10), if not decrease the weights associated with voting for the runner-up class and increase the weights associated with cells having $v_{a_R(\bar{x}),C_R} < 1$ (5.6–5.9).

Calculate the global quality value. If the quality is the highest obtained hitherto store the network (5.11).

Repeat until global quality value is satisfactory or other exit condition is fulfilled (5.12, 5.13).

EXAMPLE 3

Again the vote number function for an input example $\bar{y}$ is given as $$VoteNo(C, \bar{y}) = \frac{\sum_{i \in \Omega} w_{a_i(\bar{y}),C} \Theta_1(v_{a_i(\bar{y}),C})}{\sum_{i \in \Omega} w_{a_i(\bar{y}),C}}$$

A local quality function $Q_L(\bar{v},\bar{w},\bar{x},X)$ is defined as a measure of a vote confidence for an input training example $\bar{x}$. For an example $\bar{x}$ the confidence Conf between the true class, $C(\bar{x})$, and the runner-up class $C_R$ may be determined as:

$$Conf(\bar{x}) = \frac{\sum_{i\in\Omega} w_{a_i(\bar{x}),C(\bar{x})}\Theta_1(v_{a_i(\bar{x}),C(\bar{x})})}{\sum_{i\in\Omega} w_{a_i(\bar{x}),C(\bar{x})}} - \frac{\sum_{i\in\Omega} w_{a_i(\bar{x}),C_R}\Theta_1(v_{a_i(\bar{x}),C_R})}{\sum_{i\in\Omega} w_{a_i(\bar{x}),C_R}}$$

The confidence can be zero stating that the runner up class has a vote level equal to that of the true class (if one or more classes have a vote level equal to that of the true class we will define one of the classes different from the true one as the runner up class). The local quality function may now be defined as:

$$Q_L(\bar{v},\bar{w},\bar{x},X) = Conf(\bar{x}).$$

A threshold value may be determined for the calculated local quality value and if $Q_L < Q_{threshold}$ then the weights are updated to make $Q_L$ increase. A possible value of $Q_{threshold}$ would be 0.1 stating that the difference between the vote level of the true and that of the runner up class should at least be 10% of the maximum vote level. The weights may be updated by adjusting the weights for the runner-up class, $C_R$:

$$w_{a_i(\bar{x}),C(\bar{x}),C_R}{}^{New} = w_{a_i(\bar{x}),C_R}{}^{Old}(1-k[2\Theta_1(v_{a_i(\bar{x}),C_R})-1]),$$

where k is a small constant, and adjusting the weights for the true class $$w_{a_i(\bar{x}),C(\bar{x})}{}^{New} = w_{a_i(\bar{x}),C(\bar{x})}{}^{Old}(1+k[2\Theta_1(v_{a_i(\bar{x}),C(\bar{x})})-1]).$$

The small constant k determines the relative change in the weights to be adjusted. One possible choice would be k=00.5.

Again the number of cross-validation errors is a possible global quality measure.

$$Q_G(\bar{v},\bar{w},X) = \sum_{\bar{x}\in X} \delta_{\Lambda(\bar{x}),C(\bar{x})}.$$

The global quality criterion may be to satisfy $Q_{G>\epsilon NX}$, where $\epsilon$ is a parameter determining the fraction of training examples demanded to be correctly classified in a leave-one-out crossvalidation test.

With reference to FIG. 5, the weight updating or adjustment steps of example 3 may be described as:

Initialise all $w_{iC}$ values to zero (5.1).
Loop through all examples in the training set (5.2,5.10, 5.3).
Calculate the local quality value for each example (5.4) (Can the example be correctly classified if excluded from the training set and at the same time have sufficient "support"? (5.5) ).
If yes process next example, if not update the weights associated with cells voting on the runner-up class and update the weights associated with cells voting for the true class (5.6–5.9) in order to increase the vote level on the true class and decrease the vote level on the runner up class.
Calculate the global quality value. If the quality is the highest obtained hitherto store the network (5.11).
Repeat until global quality value is satisfactory or other exit condition is fulfilled (5.12, 5.13).

EXAMPLE 4

Again the vote number function for an input example $\bar{y}$ is defined as $$VoteNo(C,\bar{y}) = \frac{\sum_{i\in\Omega} w_{a_i(\bar{y}),C}\Theta_1(v_{a_i(\bar{y}),C})}{\sum_{i\in\Omega} w_{a_i(\bar{y}),C}}$$

The vote levels obtained for a training example when performing a cross-validation test is then:

$$VoteNo_{CV}(C,\bar{x}) = \left(\frac{\sum_{i\in\Omega} w_{a_i(\bar{x}),C}\Theta_{1+\delta_{C(\bar{x}),C}}(v_{a_i(\bar{x}),C})}{\sum_{i\in\Omega} w_{a_i(\bar{x}),C}}\right)$$

Again the runner-up class obtained using $VoteNo(C,\bar{y})$ may be denoted $C_R$ (if one or more classes have a vote level equal to that of the true class we will define one of the classes different from the true one as the runner up class).

The local quality function $Q_L(\bar{v},\bar{w},\bar{x},X)$ may now be defined by a Boolean expression.

$$Q_L(\bar{v},\bar{w},\bar{x},X) = (VoteNo_{CV}(C(\bar{x}),\bar{x})>k_1)\hat{}(VoteNo_{CV}(C_R,\bar{x})>k_2)\hat{}(\Lambda(\bar{x})=C(\bar{x}))$$

where $k_1$ and $k_2$ are two constants between 0 and 1 and $k_1>k_2$. If all three criteria ($VoteNo_{CV}(C(\bar{x}),\bar{x})>k_1$, $VoteNo_{CV}(C_R,\bar{x})<k_2$, and $\Lambda(\bar{x})=C(\bar{x})$) are satisfied then $Q_L(\bar{v},\bar{w},\bar{x},X)$ is 1 otherwise it is 0. The two criteria corresponds to demanding the vote level of the true class in a leave-one-out cross-validating test to be larger than $k_1$ and the vote level of the runner up class to be below $k_2$ with level $k_1$ being larger than level $k_2$. The VoteNo( ) function used in this example will have value between 0 and 1 if we restrict the weights to have positive value in which case a possible choice of k values are $k_1$ equal to 0.9 and $k_2$ equal to 0.6.

If the given criteria for the local quality value given by $Q_L(\bar{v},\bar{w},\bar{x},X)$ is not satisfied then the weights $w_{iC_R}$ are updated to satisfy, if possible, the criteria for $Q_L$, by adjusting the weights on the runner-up class, $C_R$:

$$W_{a_i(\bar{x}),C_R}{}^{New} = w_{a_i(\bar{x}),C_R}{}^{Old}(1-k_{3[2\Theta 1}(v_{a_i(\bar{x}),C_R})-1]),$$

where $k_3$ is a small constant, and adjusting the weights $w_{iC_R}$ on the true class:

$$w_{a_i(\bar{x}),C(\bar{x})}{}^{New} = \max(w_{a_i(\bar{x}),C(\bar{x})}{}^{Old}+k_4[2\Theta_1(v_{a_i(\bar{x}),C(\bar{x})})-1],0),$$

$k_3$ determines the relative change in the weights to be adjusted for the runner up class. One possible choice would be $k_3$ is 0.1. A feasible choice of $k_4$ could be one tenth of the mean of the absolute values of the $w_{iC}$ values.

A suitable global quality function may be defined by the summation of the local quality values for all the training input examples:

$$Q_G(\bar{v},\bar{w},X) = \sum_{\bar{x}\in X} Q_L(\bar{v},\bar{w},\bar{x},X).$$

The global quality criterion may be to satisfy $Q_G>\epsilon N_x$, where $\epsilon$ is a parameter determining the fraction of training examples demanded to pass the local quality test.

With reference to FIG. 5, the weight updating or adjustment steps of example 4 may be described as:

Initialise all $w_{iC}$ values to zero (5.1).
Loop through all examples in the training set (5.2,5.10, 5.3).
Calculate the local quality for each example (5.4) (Can the example be correctly classified if excluded from the training set and at the same time have sufficient vote "support"? (5.5)).
If yes process next example, if not update the weights associated with cells voting on the runner-up class and update the weights associated with cells voting on the true class (5.6–5.9) in order to increase the vote level on the true class and decrease the vote level on the runner up class.
Calculate the global quality function. If the quality is the highest obtained hitherto store the network (5.11).
Repeat until global quality value is satisfactory or other exit condition is fulfilled (5.12, 5.13).

EXAMPLE 5

In this example the vote number function for an input example $\bar{y}$ is given as $$VoteNo(C, \bar{y}) = \sum_{i \in \Omega} w_{a_i(\bar{y}),C} \Theta_1(v_{a_i(\bar{y}),C})$$

The local quality function and the threshold criteria is now defined so that the answer to the question "is Qlocal OK" will always be no. Thus, the local quality function may be defined as:

$Q_L$=FALSE

With these definition all training examples will be used for adjusting $w_{a_i(\bar{y}),C}$, as the answer to (5.5) will always be no.
The weight updating rule is:

$$w_{a_i(\bar{x}),C}^{New} = f_a(v_{a_i(\bar{x}),C}),$$

where $f_a(z)$ is defined as:

$$f_\alpha(z) = 1 + \Theta_\alpha(z) = \begin{cases} 2 & \text{if } z > \alpha \\ 1 & \text{if } z \leq \alpha \end{cases}$$

and a is the iteration number.
The global quality function for the $a^{th}$ iteration may be defined as:

$$Q_G^\alpha = \sum_{\bar{x} \in X} \delta_{\Lambda(\bar{x},\alpha),C(\bar{x})},$$

where $$\Lambda(\bar{x}, \alpha) = \underset{C}{\operatorname{argmax}}\left(\sum_{i \in \Omega} f_{\alpha+\delta_{C(\bar{x}),C}}(v_{a_i(x),C}) \Theta_{1+\delta_{C(\bar{x}),C}}(v_{a_i(\bar{x}),C})\right).$$

With reference to FIG. 5, the weight updating or adjustment steps of example 5 may be described as:
Initialise all $w_{iC}$ values to zero (5.1)
Loop through all examples in the training set (5.2, 5.10, 5.3).
Calculate the local quality for each example (5.4) (In this example it will always be false, i.e. it will not fulfil the quality criteria).
If $Q_L$=TRUE (5.5) proceed with next example (it will never be true for this example), else set the addressed weights using $f_a(v_{a_i(\bar{x}),C})$ which depends on the actual iteration (5.6–5.9).
Calculate the global quality value. If the quality value is the highest obtained hitherto store the network (5.11).
Repeat until the last iteration (5.12, 5.13).

Figure 6:
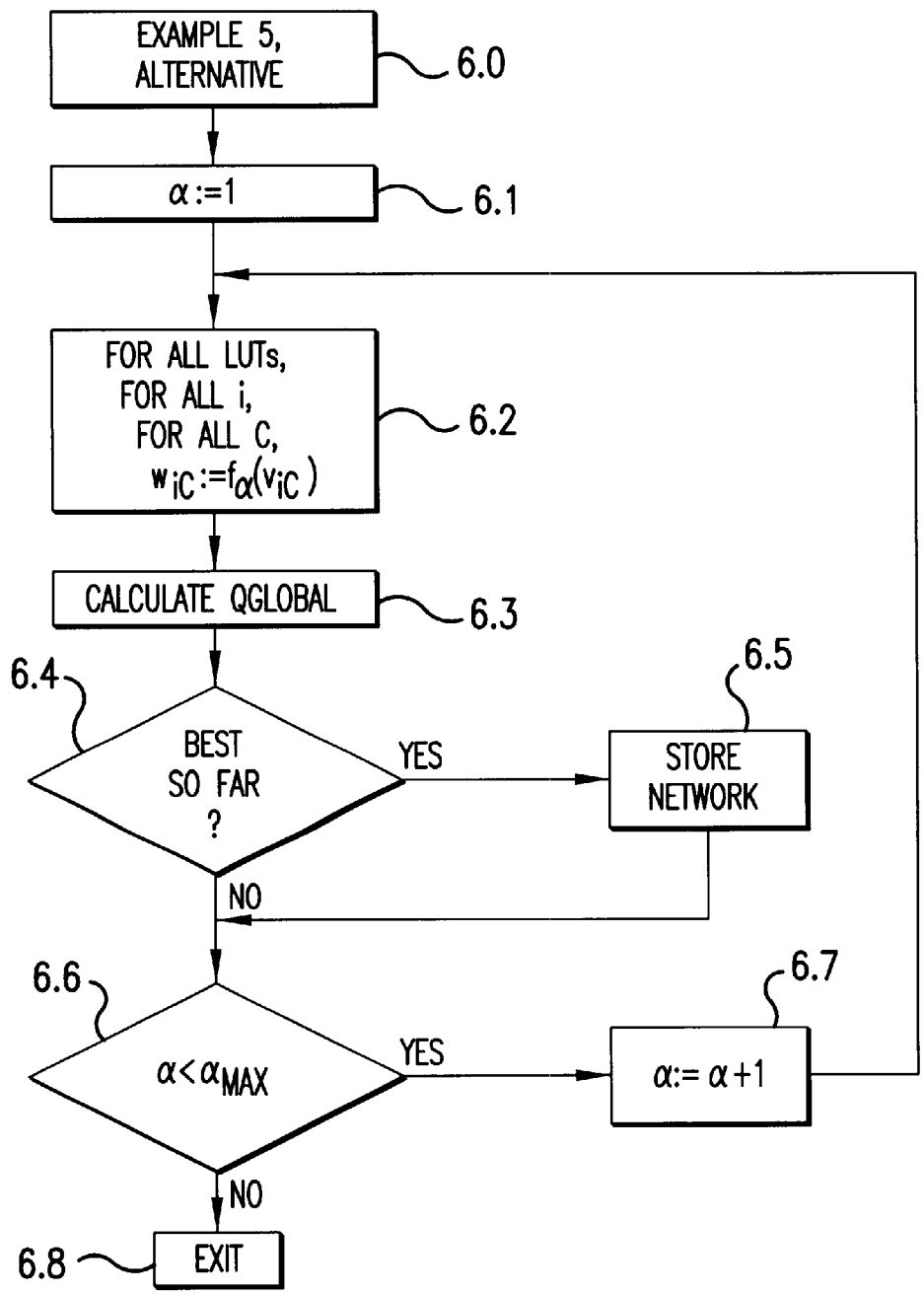
FIG. 6 shows a flow chart of a learning process for weight cells according to a second embodiment of the present invention.

Thus, the above described example 5 fits into the flow-chart structure shown in FIG. 5. However as the answer to (5.5) is always no, the weight assignment procedure can be simplified in the present case as described below with reference to FIG. 6, which shows the flow chart of a more simplified weight cell adjustment process according to the present invention:
A number of schemes, $a_{MAX}$, for setting the $w_{iC}$ values may be defined as follows (6.1, 6.6, 6.7):
Scheme a:
(6.2)
for all LUTs do:
 for all i do:
  for all C do:

$$w_{iC} = f_a(v_{iC})$$

For each a scheme a global quality function for the classification performance may be calculated (6.3). One possibility for the global quality function is to calculate a cross-validation error:

$$Q_G^\alpha = \sum_{\bar{x} \in X} \delta_{\Lambda(\bar{x},\alpha),C_{\bar{x}}},$$

where $$\Lambda(\bar{x}, \alpha) = \underset{C}{\operatorname{argmax}}\left(\sum_{i \in \Omega} f_{\alpha+\delta_{C(\bar{x}),C}}(v_{a_i(x),C}) \Theta_{1+\delta_{C(\bar{x}),C}}(v_{a_i(\bar{x}),C})\right).$$

The network having the best quality value $Q_G^\alpha$ may then be stored (6.4, 6.5). Here, it should be understood that another number of iterations may be selected and other suitable global quality functions may be defined.

The foregoing description of preferred exemplary embodiments of the invention has been presented for the purpose of illustration and description. It is not intended to be exhaustive or to limit the invention to the precise form disclosed, and obviously many modifications and variations are possible in light of the present invention to those skilled in the art. All such modifications which retain the basic underlying principles disclosed and claimed herein are within the scope of this invention.

What is claimed is:
1. A method of training a computer classification system which can be defined by a network comprising a number of n-tuples or Look Up Tables (LUTs), with each n-tuple or LUT comprising a number of rows corresponding to at least a subset of possible classes and further comprising a number of columns being addressed by signals or elements of sampled training input data examples, each column being defined by a vector having cells with values, said method comprising determining the column vector cell values based on one or more training sets of input data examples for different classes so that at least part of the cells comprise or point to information based on the number of times the corresponding cell address is sampled from one or more sets of training input examples, and determining weight cell values corresponding to one or more column vector cells being addressed or sampled by the training examples to thereby allow weighting of one or more column vectors cells of positive value during a classification process, said weight cell values being determined based on the information of at least part of the determined column vector cell values and by use of at least part of the training set(s) of input examples.

2. A method according to claim 1, wherein the determination of the weight cell values allows weighting of one or more column vector cells having a positive value (greater than 0) and one or more column vector cells having a non-positive value (lesser than or equal to 0).

3. A method according to claim 1, wherein the weight cell values are arranged in weight vectors corresponding to at least part of the column vectors.

4. A method according to claim 3, wherein all column vectors have corresponding weight vectors.

5. A method according to claim 1, wherein determination of the weight cells allows weighting of any column vector cell.

6. A method according to claim 1, wherein the weight cells are arranged in weight vectors and the determination of the weight cell values comprises initialising one or more sets of weight vectors corresponding to at least part of the column vectors, and adjusting weight vector cell values of at least part of the weight vectors based on the information of at least part of the determined column vector cell values and by use of at least part of the training set(s) of input examples.

7. A method according to claim 6, wherein the column vector cell values are determined and stored in storing means before the adjustment of the weight vector cell values.

8. A method according to claim 6, wherein the initialisation of the weight vectors comprises setting all weight vector cell values to a predetermined constant value, said predetermined value preferably being 1.

9. A method according to claim 6, wherein the initialisation of the weight vectors comprises setting each weight vector cell to a predetermined specific cell value.

10. A method according to claim 6, wherein the adjustment of the weight vector cell values comprises the steps of determining a global quality value based on at least part of the weight and column vector cell values, determining if the global quality value fulfils a required quality criterion, and adjusting at least part of the weight cell values until the global quality criterion is fulfilled.

11. A method according to claim 10, wherein the global and/or the local quality criterion is changed during the adjustment iteration process.

12. A method according to claim 10, wherein the adjustment iteration process is stopped if the global quality criterion is not fulfilled after a given number of iterations.

13. A method according to claim 10, wherein the adjusted weight cell values are stored after each adjustment, and wherein the determination of the global quality value further is followed by separately storing the hereby obtained weight cell values or classification system configuration values if the determined global quality value is closer to fulfil the global quality criterion than the global quality value corresponding to previously separately stored weight cell values or configuration values.

14. A method according to claim 6, wherein the adjustment of the weight cell values comprises the steps of
a) selecting an input data example from the training set(s),
b) determining a local quality value corresponding to the sampled training input example, the local quality value being a function of at least part of the addressed weight and column vector cell values,
c) determining if the local quality value fulfils a required local quality criterion, if not, adjusting one or more of the addressed weight vector cell values if the local quality criterion is not fulfilled,
c) selecting a new input example from a predetermined number of examples of the training set(s),
d) repeating the local quality test steps (b)–(d) for all the predetermined training in put examples,
e) determining a global quality value based on at least part of the weight and column vectors being addressed during the local quality test,
f) determining if the global quality value fulfils a required global quality criterion, and,
h) repeating steps (a)–(g) until the global quality criterion is fulfilled.

15. A method according to claim 14, wherein steps (b)–(d) are carried out for all examples of the training set(s).

16. A method according to claim 1, wherein at least part of the column cell values are determined as a function of the number of times the corresponding cell address is sampled from the set(s) of training input examples.

17. A method according to claim 1, wherein the maximum column vector value is 1, but at least part of the values have an associated value being a function of the number of times the corresponding cell address is sampled from the training set(s) of input examples.

18. A method according to claim 1, wherein the determination of the column vector cell values comprises the training steps of
a) applying a training input data example of a known class to the classification network, thereby addressing one or more column vectors,
b) incrementing, preferably by one, the value or vote of the cells of the addressed column vector(s) corresponding to the row(s) of the known class, and
c) repeating steps (a)–(b) until all training examples have been applied to the network.

19. A method of classifying input data example into at least one of a plurality of classes using a computer classification system configured according to a method of claim 1, whereby the column vector cell values and the corresponding weight vector cell values are determined for each n-tuple or LUT based on one or more training sets of input data examples, said method comprising
a) applying an input data example to be classified to the configured classification network thereby addressing column vectors and corresponding weight vectors in the set of n-tuples or LUTs,
b) selecting a class thereby addressing specific rows in the set of n-tuples or LUTs,
c) determining an output value as a function of values of addressed weight cells,
d) repeating steps (b)–(c) until an output has been determined for all classes,
e) comparing the calculated output values, and
f) selecting the class or classes having maximum output value.

20. A method according to claim 19, wherein the output value further is determined as a function of values of addressed column cells.

21. A method according to claim 20, wherein said output value is determined as a first summation of all the addressed weight vector cell values corresponding to column vector cell values greater than or equal to a predetermined value, said predetermined value preferably being 1.

22. A method according to claim 20, wherein said step of determining an output value comprises determining a first summation of all the addressed weight vector cell values corresponding to column vector cell values greater than or equal to a predetermined value, determining a second summation of all the addressed weight vector cell values, and determining the output value by dividing the first summation by the second summation.

23. A method of training a computer classification system which can be defined by a network comprising a number of n-tuples or Look Up Tables (LUTs), with each n-tuple or LUT comprising a number of rows corresponding to at least a subset of possible classes and further comprising a number of columns being addressed by signals or elements of sampled training input data examples, each column being defined by a vector having cells with values, said method comprising determining the column vector cell values based on one or more training sets of input data examples for different classes so that at least part of the cells comprise or point to information based on the number of times the corresponding cell address is sampled from one or more sets of training input examples, and determining weight cell values corresponding to at least a subset of the column vector cells to thereby allow boosting of one or more column vector cells during a classification process, said weight cell values being determined based on the information of at least part of the determined column vector cell values and by use of at least part of the training set(s) of input examples.

24. A method according to claim 23, wherein the weight cell values are determined so as to allow suppressing of one or more column vector cells during a classification process.

25. A method of determining weight cell values in a computer classification system which can be defined by a network comprising a number of n-tuples or Look Up Tables (LUTs), with each n-tuple or LUT comprising a number of rows corresponding to at least a subset of possible classes and further comprising a number of column vectors with at least part of said column vectors having corresponding weight vectors, each column vector being addressed by signals or elements of a sampled training input data example and each column vector and weight vector having cells with values being determined based on one or more training sets of input data examples for different classes, said method comprising determining the column vector cell values based on the training set(s) of input examples so that at least part of said values comprise or point to information based on the number of times the corresponding cell address is sampled from the set(s) of training input examples, and determining weight vector cell values corresponding to one or more column vector cells based on the information of at least part of the determined column vector cell values and by use of at least part of the training set(s) of input examples, said determination allowing weighting of column vector cells having a positive value (greater than 0) and column vector cells having a non-positive value (lesser than or equal to 0).

26. A system for training a computer classification system which can be defined by a network comprising a stored number of n-tuples or Look Up Tables (LUTs), with each n-tuple or LUT comprising a number of rows corresponding to at least a subset of possible classes and further comprising a number of columns being addressed by signals or elements of sampled training input data examples, each column being defined by a vector having cells with values, said system comprising input means for receiving training input data examples of known classes, means for sampling the received input data examples and addressing column vectors in the stored set of n-tuples or LUTs, means for addressing specific rows in the set of n-tuples or LUTs, said rows corresponding to a known class, storage means for storing determined n-tuples or LUTs, means for determining column vector cell values so as to comprise or point to information based on the number of times the corresponding cell address is sampled from the training set(s) of input examples, and means for determining weight cell values corresponding to one or more column vector cells being addressed or sampled by the training examples to thereby allow weighting of one or more column vectors cells of positive value during a classification process, said weight cell values being determined based on the information of at least part of the determined column vector cell values and by use of at least part of the training set(s) of input examples.

27. A system according to claim 26, wherein the means for determining the weight cell values is adapted to determine these values so as to allow weighting of one or more column vector cells having a positive value (greater than 0) and one or more column vector cells having a non-positive value (lesser than or equal to 0).

28. A system according to claim 26, wherein the means for determining the weight cell values is adapted to determine these values so that the weight cell values are arranged in weight vectors corresponding to at least part of the column vectors.

29. A system according to claim 26, wherein the means for determining the weight cell values is adapted to allow weighting of any column vector cell.

30. A system according to claim 26, wherein the means for determining the weight cell values comprises means for initialising one or more sets of weight vectors corresponding to at least part of the column vectors, and means for adjusting weight vector cell values of at least part of the weight vectors based on the information of at least part of the determined column vector cell values and by use of at least part of the training set(s) of input examples.

31. A system according to claim 30, wherein the means for initialising the weight vectors is adapted to setting all weight vector cell values to a predetermined constant value, said predetermined value preferably being one.

32. A system according to claim 30, wherein the means for initialising the weight vectors is adapted to setting each weight vector cell to a predetermined specific value.

33. A system according to claim 30, wherein the means for adjusting the weight vector cell values is adapted to determine a global quality value based on at least part of the weight and column vector cell values, determine if the global quality value fulfils a required global quality criterion, and adjust at least part of the weight cell values until the global quality criterion is fulfilled.

34. A system according to claim 33, wherein the means for adjusting the weight vector cell values is adapted to stop the iteration process if the global quality criterion is not fulfilled after a given number of iterations.

35. A system according to claim 33, wherein the means for storing n-tuples or LUTs comprises means for storing adjusted weight cell values and separate means for storing best so far weight cell values, said means for adjusting the weight vector cell values further being adapted to replace previously separately stored best so far weight cell values with obtained adjusted weight cell values if the determined global quality value is closer to fulfil the global quality criterion than the global quality value corresponding to previously separately stored best so far weight values.

36. A system according to claim 30, wherein the means for adjusting the weight vector cell values is adapted to
 a) determine a local quality value corresponding to a sampled training input example, the local quality value being a function of at least part of the addressed weight and column vector cell values, b) determine if the local quality value fulfils a required local quality criterion, c) adjust one or more of the addressed weight vector cell values if the local quality criterion is not fulfilled, d) repeat the local quality test for a predetermined number of training input examples, e) determine a global quality value based on at least part of the weight and column vectors being addressed during the local quality test, f) determine if the global quality value fulfils a required global quality criterion, and, g) repeat the local and the global quality test and associated weight adjustments until the global quality criterion is fulfilled.

37. A system according to claim 26, wherein the means for determining the column vector cell values is adapted to determine these values as a function of the number of times the corresponding cell address is sampled from the set(s) of training input examples.

38. A system according to claim 26, wherein the means for determining the column vector cell values is adapted to determine these values so that the maximum value is 1, but at least part of the values have an associated value being a function of the number of times the corresponding cell address is sampled from the training set(s) of input examples.

39. A system according to claim 26, wherein, when a training input data example belonging to a known class is applied to the classification network thereby addressing one or more column vectors, the means for determining the column vector cell values is adapted to increment the value or vote of the cells of the addressed column vector(s) corresponding to the row(s) of the known class, said value preferably being incremented by one.

40. A system according to claim 26, wherein all column vectors have corresponding weight vectors.

41. A system for training a computer classification system which can be defined by a network comprising a stored number of n-tuples or Look Up Tables (LUTs), with each n-tuple or LUT comprising a number of rows corresponding to at least a subset of possible classes and further comprising a number of columns being addressed by signals or elements of sampled training input data examples, each column being defined by a vector having cells with values, said system comprising input means for receiving training input data examples of known classes, means for sampling the received input data examples and addressing column vectors in the stored set of n-tuples or LUTs, means for addressing specific rows in the set of n-tuples or LUTs, said rows corresponding to a known class, storage means for storing determined n-tuples or LUTs, means for determining column vector cell values so as to comprise or point to information based on the number of times the corresponding cell address is sampled from the training set(s) of input examples, and means for determining weight cell values corresponding to at least a subset of the column vector cells to thereby allow boosting of one or more column vectors cells during a classification process, said weight cell values being determined based on the information of at least part of the determined column vector cell values and by use of at least part of the training set(s) of input examples.

42. A system according to claim 41, wherein means for determining the weight cell values is adapted to determine these values so as to allow suppressing of one or more column vector cells during a classification process.

43. A system for determining weight cell values of a classification network which can be defined by a stored number of n-tuples or Look Up Tables (LUTs), with each n-tuple or LUT comprising a number of rows corresponding to at least a subset of the number of possible classes and further comprising a number of column vectors with at least part of said column vectors having corresponding weight vectors, each column vector being addressed by signals or elements of a sampled training input data example and each column vector and weight vector having cell values being determined during a training process based on one or more sets of training input data examples, said system comprising: input means for receiving training input data examples of known classes, means for sampling the received input data examples and addressing column vectors and corresponding weight vectors in the stored set of n-tuples or LUTs, means for addressing specific rows in the set of n-tuples or LUTs, said rows corresponding to a known class, storage means for storing determined n-tuples or LUTs, means for determining column vector cell values so as to comprise or point to information based on the number of times the corresponding cell address is sampled from the training set(s) of input examples, and means for determining weight vector cell values corresponding to one or more column vector cells based on the information of at least part of the determined column vector cell values and by use of at least part of the training set(s) of input examples, said determination allowing weighting of one or more column vector cells having a positive value (greater than 0) and one or more column vector cells having a non-positive value (lesser than or equal to 0).

44. A system for classifying input data examples into at least one of a plurality of classes, said system comprising: storage means for storing a number or set of n-tuples or Look Up Tables (LUTs) with each n-tuple or LUT comprising a number of rows corresponding to at least a subset of the number of possible classes and further comprising a number of column vectors with corresponding weight vectors, each column vector being addressed by signals or elements of a sampled input data example and each column vector and weight vector having cells with values being determined during a training process based on one or more sets of training input data examples, said system further comprising: input means for receiving an input data example to be classified, means for sampling the received input data example and addressing columns and corresponding weight vectors in the stored set of n-tuples or LUTs, means for addressing specific rows in the set of n-tuples or LUTs, said rows corresponding to a specific class, means for determining an output value as a function of addressed weight cells, and means for comparing calculated output values corresponding to all classes and selecting the class or classes having maximum output value.

45. A system according to claim 44, wherein the output value further is determined as a function of values of addressed column cells.

46. A system according to claim 44, wherein the output determining means comprises means for producing a first summation of all the addressed weight vector cell values corresponding to a specific class and corresponding to column vector cell values greater than or equal to a predetermined value.

47. A system according to claim 46, wherein the output determining means further comprises means for producing a second summation of all the addressed weight vector cell values corresponding to a specific class, and means for determining the output value by dividing the first summation by the second summation.

48. A system according to claim 44, wherein the cell values of the column vectors and the weight vectors have been determined by use of a training system, wherein the determination of the weight cell values allows weighting of one or more column vector cells having a positive value (greater than 0) and one or more column vector cells having a non-positive value (lesser than or equal to 0).

49. A system according to claim 44, wherein the cell values of the column vectors and the weight vectors have been determined during a training process comprising the steps of:

determining the column vector cell values based on one or more training sets of input data examples for different classes so that at least part of the cells comprise or point to information based on the number of times the corresponding cell address is sampled from one or more sets of training input examples, and determining weight cell values corresponding to one or more column vector cells being addressed or sampled by the training examples to thereby allow weighting of one or more column vectors cells of positive value during a classification process, said weight cell values being determined based on the information of at least part of the determined column vector cell values and by use of at least part of the training set(s) of input examples.

* * * * *